United States Patent
Olsson et al.

(10) Patent No.: US 9,549,348 B2
(45) Date of Patent: Jan. 17, 2017

(54) RESTORATION OF USER EQUIPMENT CONTROL IN THE PRESENCE OF COMMUNICATION LINK FAILURE BETWEEN PACKET SWITCHED AND CIRCUIT SWITCHED CONTROLLING NODES

(71) Applicant: Telefonaktiebolaget L M Ericsson (publ), Stockholm (SE)

(72) Inventors: Lars-Bertil Olsson, Angered (SE); Peter Ramle, Molnlycke (SE); Yong Yang, Kallered (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/405,170

(22) PCT Filed: Dec. 2, 2014

(86) PCT No.: PCT/EP2014/076275
§ 371 (c)(1),
(2) Date: Dec. 3, 2014

(87) PCT Pub. No.: WO2015/090941
PCT Pub. Date: Jun. 25, 2015

(65) Prior Publication Data
US 2016/0269942 A1 Sep. 15, 2016

Related U.S. Application Data

(60) Provisional application No. 61/918,698, filed on Dec. 20, 2013.

(51) Int. Cl.
*H04W 36/00* (2009.01)
*H04L 25/20* (2006.01)
*H04W 36/14* (2009.01)

(52) U.S. Cl.
CPC .......... *H04W 36/0022* (2013.01); *H04L 25/20* (2013.01); *H04W 36/14* (2013.01)

(58) Field of Classification Search
CPC .... H04W 36/0022; H04W 36/14; H04L 25/20
(Continued)

(56) References Cited

U.S. PATENT DOCUMENTS

2014/0050199 A1* 2/2014 Chen ............... H04W 24/04
370/331
2015/0282011 A1* 10/2015 Watfa ............... H04W 36/0022
370/332

FOREIGN PATENT DOCUMENTS

EP 2 079 253 A1 7/2009
WO 2012/062344 A1 5/2012

OTHER PUBLICATIONS

Alcatel-Lucent et al. "Restoration of CS services after MME failure without restart" 3GPP Draft C4-111166, TSG CT4 Meeting #53, Tallinn, Estonia, May 9-13, 2011, pp. 1-4.*
(Continued)

*Primary Examiner* — Shahriar Behnamian
(74) *Attorney, Agent, or Firm* — Leffler Intellectual Property Law, PLLC; Kenneth B. Leffler

(57) ABSTRACT

User equipment control is restored in the presence of communication link failure between a network node that provides control of packet switched connections and a network node that provides control of circuit switched connections. A communication service is provided to a UE by a Serving MME and a Serving MSC in a communication system. Upon detecting that one or more links that enable communication between the Serving MME and the Serving MSC have failed, another MME and/or MSC are/is identified within the network that have/has fully operational links with the Serving MSC and/or Serving MME. The identified MME and/or MSC are/is established as a Relaying MME and/or Relaying (Continued)

MSC. Control of the UE continues with MME/MSC messaging being directed to the Relaying node(s), and the Relaying node(s) relaying the messages to their serving counterparts (Relaying MME relays to Serving MME, Relaying MSC relays to Serving MSC).

31 Claims, 10 Drawing Sheets

(58) Field of Classification Search
USPC .................................................. 455/436–444
See application file for complete search history.

(56) References Cited

OTHER PUBLICATIONS

PCT International Search Report, mailed Mar. 26, 2015, in connection with International Application No. PCT/EP2014/076275, all pages.
PCT Written Opinion, mailed Mar. 26, 2015, in connection with International Application No. PCT/EP2014/076275, all pages.
Ericsson "Discussion on SGS and Sv path failure" 3GPP Draft C4-140056, TSG CT WG4 Meeting #64, Guang Zhou, China, Jan. 20-24, 2014, pp. 1-6.
3GPP TS 29.060 V12.2.0 "GPRS Tunnelling Protocol (GTP) across the Gn and Gp interface" Release 12, Sep. 2013, pp. 1-177.
3GPP TS 23.401 V12.2.0 "GPRS enhancements for E-UTRAN Access" Release 12, Sep. 2013, pp. 1-293.
3GPP TS 29.274 V12.2.0 3GPP Evolved Packet System (EPS); Evolved General Packet Radio Service (GPRS); Tunnelling Protocol for Control plan (GTPv2-C); Stage 3, Release 12, Sep. 2013, pp. 1-230.
3GPP TS 29.118 V12.2.0 Mobility Management Entity (MME)—Visitor Location Register (VLR) SGs interface specification (Release 12), Sep. 2013, pp. 1-68.
3GPP TS 23.272 V11.6.0 "Circuit Switched (CS) fallback in Evolved Packet System (EPS); Stage 2" Release 11, Sep. 2013, pp. 1-97.
3GPP TS 23.216 V11.9.0 "Single Radio Voice Call Continuity (SRVCC); Stage 2" Release 11, Jun. 2013, pp. 1-68.
3GPP TS 23.007 V12.2.1 "Restoration procedures" Release 12, Sep. 2013, pp. 1-80.
3GPP TS 23.236 V12.0.0 "Intra-domain connection of Radio Access Network (RAN) nodes to multiple core network (CN) nodes" Release 12, Jun. 2013, pp. 1-40.
3GPP TS 23.018 V12.2.0 "Basic call handling; Technical realization" Release 12, Sep. 2013, pp. 1-300.
3GPP TS 24.301 V12.2.0 "Non-Access-Stratum (NAS) protocol for Evolved Packet System (EPS); Stage 3" Release 12, Chapter 5.5.2.3.2, Sep. 2013, pp. 1-16; 106-109.
3GPP TS 23.272 V11.6.0 "Circuit Switched 9CS) fallback in Evolved Packet System (EPS); Stage 2" Release 12, Sep. 2013, pp. 1-97.

\* cited by examiner

RESTORATION OF USER EQUIPMENT CONTROL IN THE PRESENCE OF COMMUNICATION LINK FAILURE BETWEEN PACKET SWITCHED AND CIRCUIT SWITCHED CONTROLLING NODES

CROSS-REFERENCE TO RELATED APPLICATIONS

This application claims the benefit of U.S. Provisional Application 61/918,698, filed Dec. 20, 2013, which is hereby incorporated herein by reference in its entirety.

BACKGROUND

The invention relates to cellular communication systems, and more particularly to restoration of user equipment control in the presence of communication link failure between a network node that provides control of packet switched connections and a network node that provides control of circuit switched connections.

Various aspects of embodiments are described with reference to one or more standards issued by the Third Generation Partnership Project (3GPP), and the terminology used in those standards is often used herein. This is done for the purpose of facilitating an understanding of the described embodiments because the standardized terminology and concepts are well known to those skilled in the art. However, the reference to particular standards as well as the use of such terminology and examples is not intended to mean or suggest that the various described aspects are applicable only in environments that conform to the mentioned standards. To the contrary, the issues described herein as well as the disclosed solutions and features can arise in technological environments that do not conform to the mentioned standards, and it is fully intended that the described embodiments are intended only as examples and are not limited to the particular embodiments or standards disclosed herein.

As illustrated by FIG. 1, a User Equipment (UE) 101 may interact in the digital realm (i.e., via the communication of data packets) with the Evolved Packet Switching system (EPS) 100 using the radio access mechanisms provided by the Evolved Universal Terrestrial Radio Access Network (E-UTRAN) 103. The interface between the UE and E-UTRAN is denoted "LTE-Uu". This latest equipment provides communication services to a UE 101 (both voice and other information) by means of Packet Switched (PS) technology. UE-related control signaling is handled by a Mobility Management Entity (MME) 105 with support of subscription information provided by the Home Subscriber Server (HSS) 107. The MME 105 communicates with E-UTRAN 103 via an S1-MME interface. The MME 105 interacts with the HSS 107 via an S6A interface. The MME can also interact with one or more other MMEs by mean of an S10 interface.

User payload is handled by the Serving Gateway (S-GW) 109 and the Packet Data Network (PDN) Gateway (P-GW) 111. The S-GW 109 is coupled to E-UTRAN via an S1-U interface, and the S-GW 109 is coupled to the P-GW 111 via an S5 interface. The P-GW 111 may interact, via a Gx interface, with a Policy and Charging Rules Function (PCRF) 113.

An operator's Internet Protocol (IP) Services 115 (e.g., (Internet Protocol) Multimedia Subsystem (IMS), etc.) can be reached by the P-GW 111 via an SGi interface, and the PCRF 113 can interact with the operator's IP Services 115 via an Rx interface.

The system also provides for interaction with legacy system technology. For example, the MME 105 can interact with a Serving GPRS (General Packet Radio Service) Support Node (SGSN) 117 via an S3 interface. To support Circuit Switched (CS) communication links, a Mobile Switching Center (MSC) 119 is provided, and this is able to communicate with the MME 105 by means of two different interfaces: an SGs interface and an Sv interface.

Because deploying a new type of system is a gradual process, mechanisms are put in place that allow the new (e.g., PS-based) system to coexist with legacy (e.g., CS-based) systems that have already been put into place, and it is useful (and sometimes necessary) to allow a UE's service to switch from one type of service support to another, based upon its movement and the type of service support that is available in any particular area. Present embodiments, therefore, permit a UE to obtain service not only from the latest packet switched equipment, but also from legacy systems that employ CS technology. Registration for the CS domain is performed by the MME 105 and a (legacy system) Mobile Switching Center (MSC) 119 by means of interaction at the illustrated SGs interface. As is known in the art, Single Radio Voice Call Continuity (SRVCC) is a process/technology by which an ongoing voice call that is presently being handled by a network's Voice over IP (VoIP)/IP (Internet Protocol) Multimedia Subsystem (IMS) in the data packet switched domain can be transitioned to a legacy system's circuit switched domain. The SRVCC feature is transacted over the illustrated Sv interface.

As shown in FIG. 2a, the 3GPP network may be organized using multiple MMEs serving the same tracking areas of a Long Term Evolution (LTE) radio network. The organization of multiple MMEs is referred to as an "MME Pool".

In the example of FIG. 2a, a first MME Pool 201 comprises MMEs 1 and 2 and serves the Evolved Node B (eNB) service areas 1 and 2 identified as PS pool-area 1. A second MME Pool 203 comprises MMEs 3, 4, and 5, and serves the eNB service areas 3, 4, 5, and 6 identified as PS pool-area 2. Although not shown in this example, it will be noted that one or more of the eNBs could be in more than one PS pool-area (e.g., Area 3 could be in both PS pool-area 1 and PS pool-area 2).

As shown in FIG. 2b, the 3GPP network may also be organized using multiple SGSNs serving the same routing areas of a GERAN (GSM (Global System for Mobile communication) EDGE (Enhanced Data for GSM Evolution) Radio Access Network)/UTRAN radio network. The organization of multiple SGSNs is referred to as an "SGSN Pool" Likewise, it is possible for the 3GPP network to include an organization of multiple MSCs serving the same location areas of a GERAN/UTRAN radio network, with that organization being referred to as an "MSC pool".

In the example of FIG. 2b, a first MSC Pool 205 comprises MSCs 1, 2, and 3, and serves the RAN node service areas 1, 2, 5, and 6 identified as CS pool-area 1. A second MSC Pool 207 comprises MSCs 4, 5, and 6, and serves the RAN node service areas 2, 3, 6, and 7 identified as CS pool-area 2. It will be observed that two of the RAN node service areas, namely areas 2 and 6, are in both CS pool-area 1 and CS pool-area 2.

FIG. 2b further illustrates a first SGSN Pool 209 that comprises SGSNs 1 and 2, and serves the RAN node service areas 1 and 5 identified as PS pool-area 1. A second SGSN Pool 211 comprises SGSNs 3, 4, and 5, and serves the RAN node service areas 2, 3, 6, and 7 identified as PS pool-area 2.

FIG. 2b also shows a single MSC 213 serving RAN service areas 4 and 8; and also shows a single SGSN 215 serving RAN service areas 4 and 8.

MME Triggered Service Restoration Procedure

There are two different failure scenarios applicable to SGs interface that may trigger the MME to perform a re-registration of a UE in the CS domain, either in the previously serving MSC or in a new MSC. The case involving a new MSC requires that the MSC pool be deployed. The two cases are
- Path failure: a break in the signaling control path between the MME and the MSC. This is detected by broken communication. There may be any of a number of reasons for the break, such as one of the node peers being no longer operational, the transport network being no longer operation, and the like.
- The MSC or MME being restarted: This is detected by a restart indication in communication between the nodes once both nodes are operational again.

When the MME receives an indication from the serving MSC/VLR that a VLR restart has occurred, or if the VLR is no longer in service if there are no more Stream Control Transmission Protocol (SCTP) associations in service with that VLR for a given period of time, then the MME initiates an SGs restoration procedure as follows:
1) Upon receipt of a combined Tracking Area (TA) update request or periodic Tracking Area Update request from a UE that is attached to both EPS and non-EPS services, the MME may request the UE to re-attach to non-EPS services or the UE may alternatively immediately perform the Location Update (LU) for non-EPS services procedure towards the Visitor Location Register (VLR).
2) Upon reception of a Combined TA/LA (update or periodic Tracking Area Update from a UE that is attached for non-EPS service), the MME may either:
   a. request the UE to re-attach to non-EPS services and then select an alternative available VLR to serve the UE for CS services during the subsequent combined TA/LA update procedure;
   b. or immediately perform the Location Update for non-EPS services procedure towards an alternative available VLR.
3) Upon reception of an Uplink Non-Access Stratum (NAS) Transport message from a UE that is attached for non-EPS service, if the Visitor Location Register (VLR) serving the UE is no longer in service, the MME may request the UE to re-attach to non-EPS services and then select an alternative available VLR to serve the UE for MO Short Message Service (SMS) and other CS services during the subsequent combined TA/LA update procedure. See 3GPP TS 29.118 for the details. Although it is not specified in the current standard, this procedure is also a functionally viable approach for handling instances in which the UE is already in the ECM-CONNECTED state.

For the Sv interface, since there is no registration procedure towards the MSC for a given UE, which is unlike for SGs interface, where the SGs association must be established before CS fallback procedures can be continued, the MME will contact an MSC only when an SRVCC PS to CS handover is required; that is, when a UE is moving toward a 2G/3G coverage area and leaving an LTE coverage area, where the ongoing voice call should be transferred from the PS domain to the CS domain. So, when SRVCC functionality has been invoked and a path failure on the Sv interface has been detected when trying to make an SRVCC PS to CS Request towards the selected MSC, then the MME tries to perform the SRVCC PS to CS procedure to any other available MSC using the Sv interface. This requires of course that there be more than one MSC serving Sv and the UEs location (i.e., the MSC pool must be deployed). But, when no MSC is available to the MME, the restoration procedure initiated by the MME must be triggered; otherwise the voice call will be terminated due to the UE having left the LTE coverage area.

MSC Initiated SGs Restoration (See 3GPP TS 23.007, Chapter 26 for Further Details)

When the VLR has to page the UE for a Mobile Terminated (MT) CS service (e.g., upon receipt of an incoming CS call), if the VLR detects that the MME serving the UE is no longer in service, the VLR should send an SGs paging request with a CS restoration indicator to an alternative MME in the same MME pool. The VLR should load-balance the paging requests among the available MMEs in the pool during the restoration procedure in order to avoid unduly burdening one or only a few of the MMEs in the pool.

The VLR may know the set of MMEs pertaining to the same MME pool by local configuration or by checking the MME Group ID within the MME name that MMEs signal to the VLR in the SGsAP-LOCATION-UDATE-REQUEST, SGsAP-RESET-INDICATION or SGsAP-RESET-ACK messages. The MME should send an SGsAP-RESET-INDICATION message to the VLR after restart.

The VLR may detect that an MME is no longer in service if there are no more SCTP associations in service with that MME.

The MME shall accept the SGs paging request and proceed as follows upon receipt of an SGs paging request that includes the CS restoration indicator:
- If the International Mobile Subscriber Identity (IMSI) is unknown by the MME, or if the IMSI is known and the UE is marked as EPS Mobility Management (EMM)-DEREGISTERED, the MME shall send the paging request with the location information provided by the VLR, regardless of the value of the "MME-Reset" indicator. If no such location information is provided, the MME may either page the UE in all the tracking areas corresponding to that MME or in the tracking areas served by the MME and by the VLR, or reject the paging request per operator policy. The paging request shall include the IMSI and the CN domain indicator set to "PS" to request the UE to re-attach;
- If the IMSI is known by the MME and the UE is considered to be attached to both EPS and non-EPS services or for SMS only (for an SGs paging request with an "SMS indicator"), the MME shall page the UE based on the location information stored in the MME.

Upon receipt of a paging request including the IMSI and the CN domain indicator set to "PS", the UE re-attaches to one MME of the pool (the particular one may not necessarily be the MME that initiated the paging procedure towards the UE) and a new SGs association is established with the VLR. This VLR may not be the same VLR that initiated the SGs paging procedure (e.g., if Intra Domain Connection of RAN Nodes to Multiple CN Nodes is deployed for GERAN or UTRAN (see 3GPP TS 23.236)).

If the new SGs association is established towards the same VLR, the VLR should repeat the SGs paging request after the UE has re-attached to non-EPS services. The MT CS service or SMS is then delivered according to normal procedures.

If the new SGs association is established towards a different VLR, the MT CS service may be delivered via the new VLR using Mobile Terminating Roaming Retry or Mobile Terminating Roaming Forwarding (see 3GPP TS 23.018); the on-going MT SMS is retransmitted by the SMS-SC using the existing SMS procedures (SMS alert).

It is evident that, in each of the above-described restoration procedures, the MME must be able to reach an available MSC. However, this may not be possible in all circumstances.

In a scenario in which the MME is unable to reach an MSC, the UE is not served by combined procedures but is instead limited only to Evolved Packet Core (EPC) services only. Further, in such instances SRVCC PS to CS handover will not be possible.

The existing behaviors specified in the current 3GPP specifications are not optimal if the communication error is local to an MME in an MME pool and there are other MMEs in the same pool which do have a connection to suitable MSC(s). In this case, it is not optimal that the UE is denied CS services despite that MSC(s) is/are available to the MME pool when using a different MME.

When an MME suffers from a connectivity outage to all MSCs, i.e. when there no longer is any connectivity at interface SGs, the MME will no longer receive any MT call or serve a Mobile Originated (MO) call for served UEs that are combined attached. Nor will SRVCC be possible.

In case the issue is local to a single MME it may be resolved by having the serving MME force the UE to be moved to a different MME within the MME Pool, for example by executing load rebalancing Tracking Area Update (TAU).

However, it is herein observed that there are some issues with that approach.

If the SGs/Sv connectivity error is common to all MMEs in the MME Pool, the new MME will also fail to perform SGs/Sv signaling. The result would be that the new MME would also deny the UE's combined attachment. Nor will SRVCC be possible. Further, extra signaling will be induced by moving the UE from one MME to another.

The UE would then either attempt to perform an access change to get CS attached in 2G/3G (voice centric), or would alternatively remain in the LTE access and no longer be able to use CS services (data centric). An ongoing Voice over LTE (VoLTE) call may also be dropped when going out of LTE coverage.

If the UE remains in the LTE access, the behavior is at risk of going cyclic with a never ending sequence of inter-MME TAU procedure executions impacting all UEs that make requests to get interface (I/F) SGs-related services.

In case the issue is local to only some MMEs in the MME Pool, the approach would succeed and the UEs would eventually be registered by an MME that is able to signal at the I/F SGs.

However, it would at the same time create a load balancing problem since the data centric UEs that chose to remain being served in the LTE access are moved from an MME that has lost SGs connectivity to an MME that does not have that problem. The result is that all UEs that request Circuit Switched FallBack (CSFB—so-called because this feature enables voice services to be delivered to packet-capable equipment by means of legacy circuit-switched network elements) are concentrated to some MMEs in the pool, thereby making the UE distribution and the resulting node load no longer randomized over the nodes in the pool.

When the situation normalizes it would be necessary to redistribute UE registrations over the pool to get an even load distribution. But since the load distribution is no longer randomized, this cannot be easily performed by existing load distribution mechanisms.

In view of the above-described issues, it is desired to provide technology (e.g., methods, apparatuses, processor-readable storage medium, etc.) that are capable of providing a backup mechanism for establishing a reconnection between, on the one hand, an entity such as an MME and, on the other hand, an entity such as an MSC when an attempted primary reconnection mechanism experiences a problem.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof. Also, as used herein the term "exemplary" means serving as one illustration out of any number of possible illustrations.

In accordance with one of a number of aspects of the present invention, the foregoing and other objects are achieved in technology (e.g., methods, apparatus, processor-readable storage media) that restores user equipment control in the presence of communication link failure between a network node that provides control of packet switched connections and a network node that provides control of circuit switched connections. In some but not necessarily all embodiments, a communication service is provided to a UE by a Serving MME and a Serving MSC in a communication system. At some point, it is detected that one or more links that enable communication between the Serving MME and the Serving MSC have failed. Another MME and/or MSC are/is identified within the network that have/has fully operational links with the Serving MSC and/or Serving MME. Signaling is performed to establish the identified MME and/or MSC or any other type of entity that is able to serve as a Relaying MME and/or Relaying MSC. Control of the UE continues with the Relaying MME communicating messages with the Serving MSC or Relaying MSC, and/or with the Relaying MSC communicating messages with the Serving MME or Relaying MME, and further with the Relaying MME relaying the messages to the Serving MME and/or with the Relaying MSC relaying the messages to the Serving MSC.

In another aspect of some but not necessarily all embodiments, a relaying node may identify itself in any of a number of different ways to a node from the other domain (i.e., PS relaying node identifying itself to a node in the CS domain, or CS relaying node identifying itself in the PS domain). More particularly, a relaying node may be identified either as a relaying node, or as a replacement for the no longer reachable node (i.e., the relaying node may present itself with an identity matching the no longer present node). Both of these approaches may be useful.

In another aspect of some but not necessarily all embodiments, user equipment control is restored in the presence of communication link failure between a network node that provides control of packet switched connections and a network node that provides control of circuit switched connections. Such restoration includes using a serving node of a first type in communication with a node of a second type to provide a communication service to a user equipment, wherein the serving node of the first type controls one of packet switched connections and circuit switched connections, and the node of the second type controls a different one of packet switched connections and circuit switched connections. A failure of one or more links that enable communication between the serving node of the first type and the node of the second type is detected, and another node is identified, wherein the identified node is to be used as a first relaying node and is one of another node of the first type that has fully operational links with the node of the second type; and another node of the second type that has fully operational links with the serving node of the first type. Signaling is performed to establish the identified node as the first relaying node, and the communication service then continues to be provided to the user equipment by using the first relaying node to communicate one or more messages between the serving node of the first type and the node of the second type.

In another aspect of some but not necessarily all embodiments, the serving node of the first type is a serving mobility management entity, the first relaying node is a relaying mobility management entity; and the serving and relaying mobility management entities are in a same mobility management entity pool. The node of the second type in such embodiments can, for example, be a serving mobile switching center. In another example, the node of the second type is a relaying mobile switching center that communicates messages between the relaying mobility management entity and a serving mobile switching center.

In another aspect of some but not necessarily all embodiments, the serving node of the first type is a serving mobile switching center, the first relaying node is a relaying mobile switching center, and the serving and relaying mobile switching centers are in a same mobile switching center pool. The node of the second type in such embodiments can, for example, a serving mobility management entity. In another example, the node of the second type is a relaying mobility management entity that communicates messages between the relaying mobile switching center and a serving mobility management entity.

In another aspect of some but not necessarily all embodiments, detecting the failure of one or more links that enable communication between the serving node of the first type and the node of the second type is performed by the serving node of the first type; identifying said another node, wherein the identified node is to be used as the first relaying node, is performed by the serving node of the first type; the first relaying node is of the second type; and the node of the second type is a serving node of the second type. Furthermore continuing to provide the communication service to the user equipment by using the first relaying node to communicate one or more messages between the serving node of the first type and the node of the second type comprises the first relaying node relaying a message from the serving node of the first type to the serving node of the second type, wherein the message indicates that the serving node of the second type should continue with the communication service to the user equipment by re-registering the user equipment with a different node of the first type.

In some but not necessarily all of such embodiments, the serving node of the first type is a serving mobile switching center; the first relaying node is a relaying mobility management entity; the serving node of the second type is a serving mobility management entity; and the different node of the first type is a different mobile switching center.

In some other but not necessarily all of such other embodiments, the first relaying node relaying the message from the serving node of the first type to the serving node of the second type comprises tunneling Circuit Switched FallBack-related signaling between the first relaying node and the serving node of the second type.

In another aspect of some but not necessarily all embodiments, performing signaling to establish the identified node as the first relaying node comprises tunneling Circuit Switched FallBack-related signaling between the first and second mobility management entities.

In some but not necessarily all of such embodiments, performing signaling to establish the identified node as the first relaying node comprises the first relaying node triggering a procedure that causes the first relaying node to become, from a point of view of the node of the second type, an associated node of the first type in place of the serving node of the first type.

In another aspect of some but not necessarily all embodiments, the first relaying node is a relaying node of the first type; and performing signaling to establish the identified node as the first relaying node comprises signaling to the node of the second type that messages between the node of the second type and the serving node of the first type are via the first relaying node.

In some but not necessarily all such embodiments the node of the second type is a relaying node of the second type that communicates messages between the first relaying node and a serving node of the second type; and control restoration comprises the relaying node of the second type signaling to the serving node of the second type that messages between the serving node of the second type and the serving node of the first type are via the first relaying node.

In another aspect of some but not necessarily all embodiments, continuing to provide the communication service to the user equipment by using the first relaying node to communicate one or more messages between the serving node of the first type and the node of the second type comprises one or both of:

the serving node of the first type sending, to the first relaying node, one or more messages that are directed to the serving node of the second type; and the serving node of the first type receiving, from the first relaying node, one or more messages that originated from the node of the second type.

BRIEF DESCRIPTION I/F THE DRAWINGS

The objects and advantages of the invention will be understood by reading the following detailed description in conjunction with the drawings in which.

DETAILED DESCRIPTION

Figure 1:
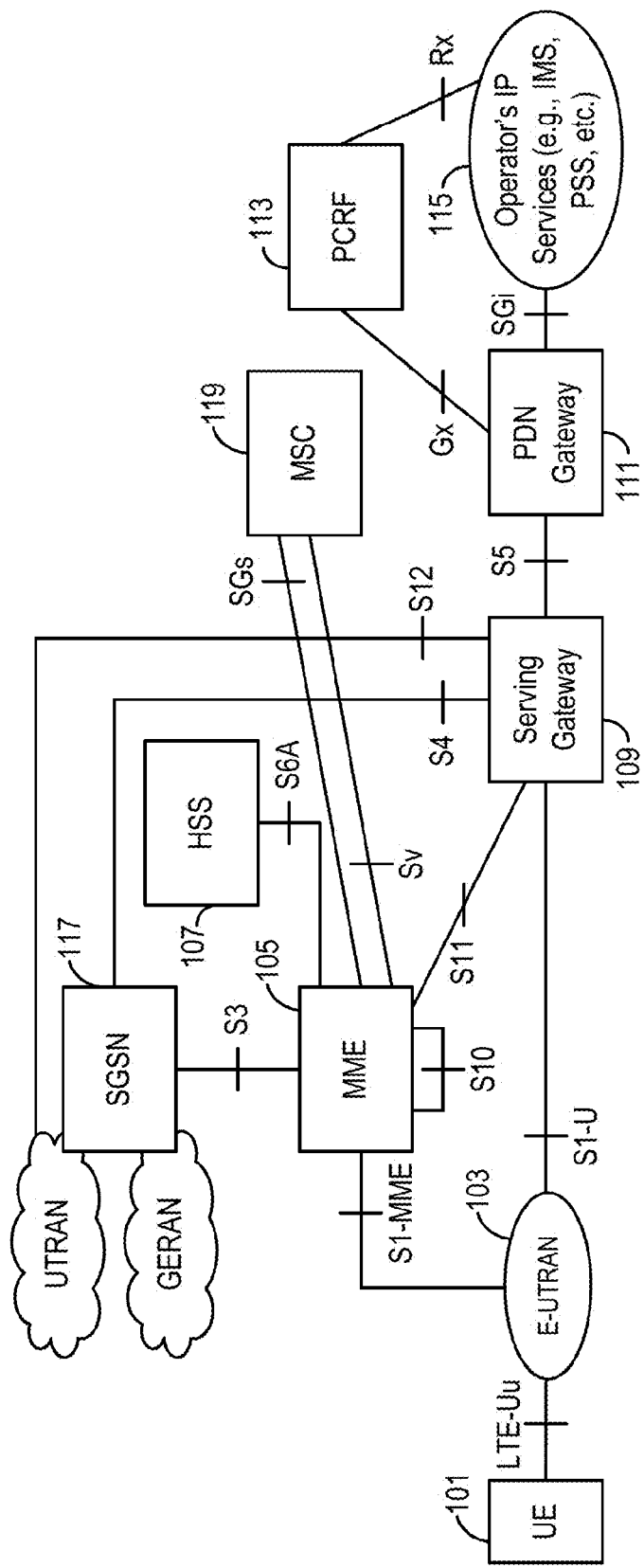
FIG. 1 is a diagram of a UE deriving communication service from an Evolved Packet Switching system.
Figure 2A:
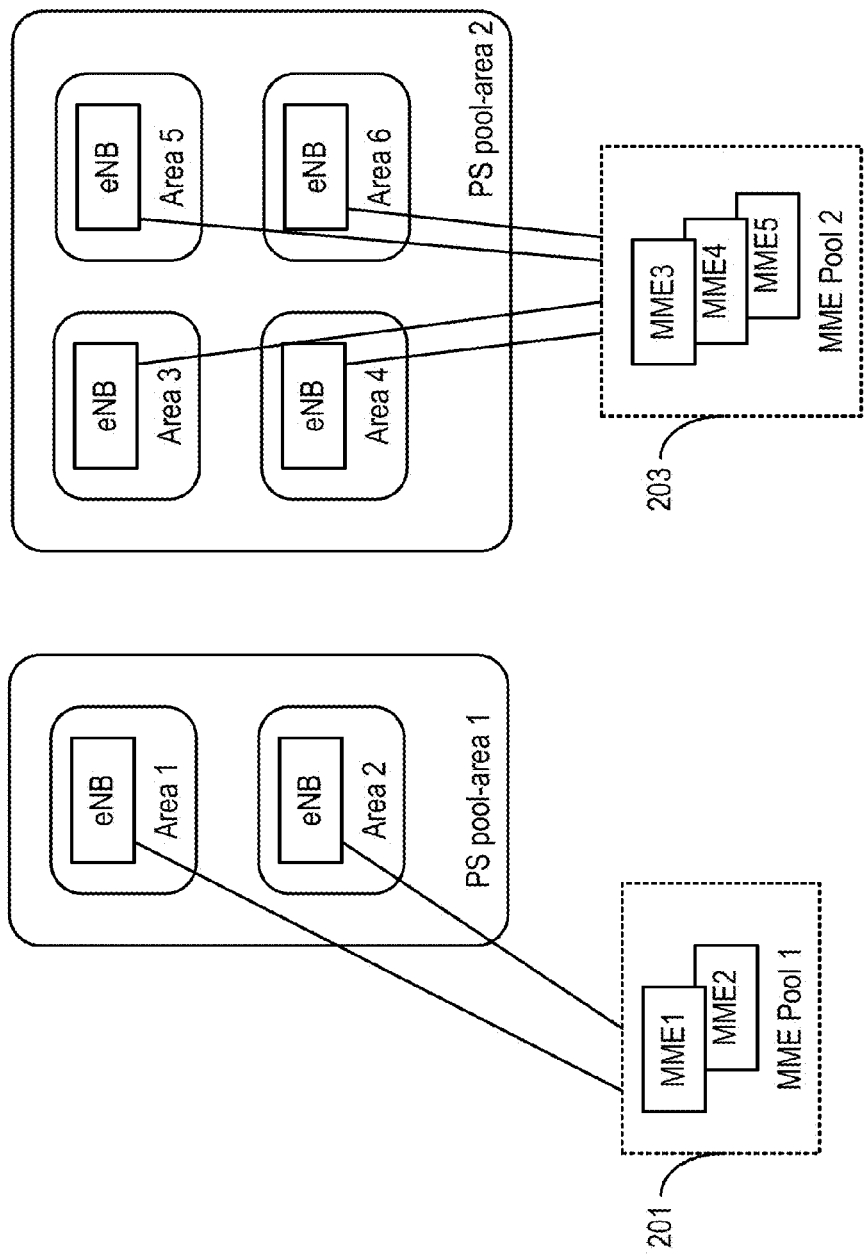
FIG. 2a is a diagram of part of a 3GPP network that includes MME pools.
Figure 2B:
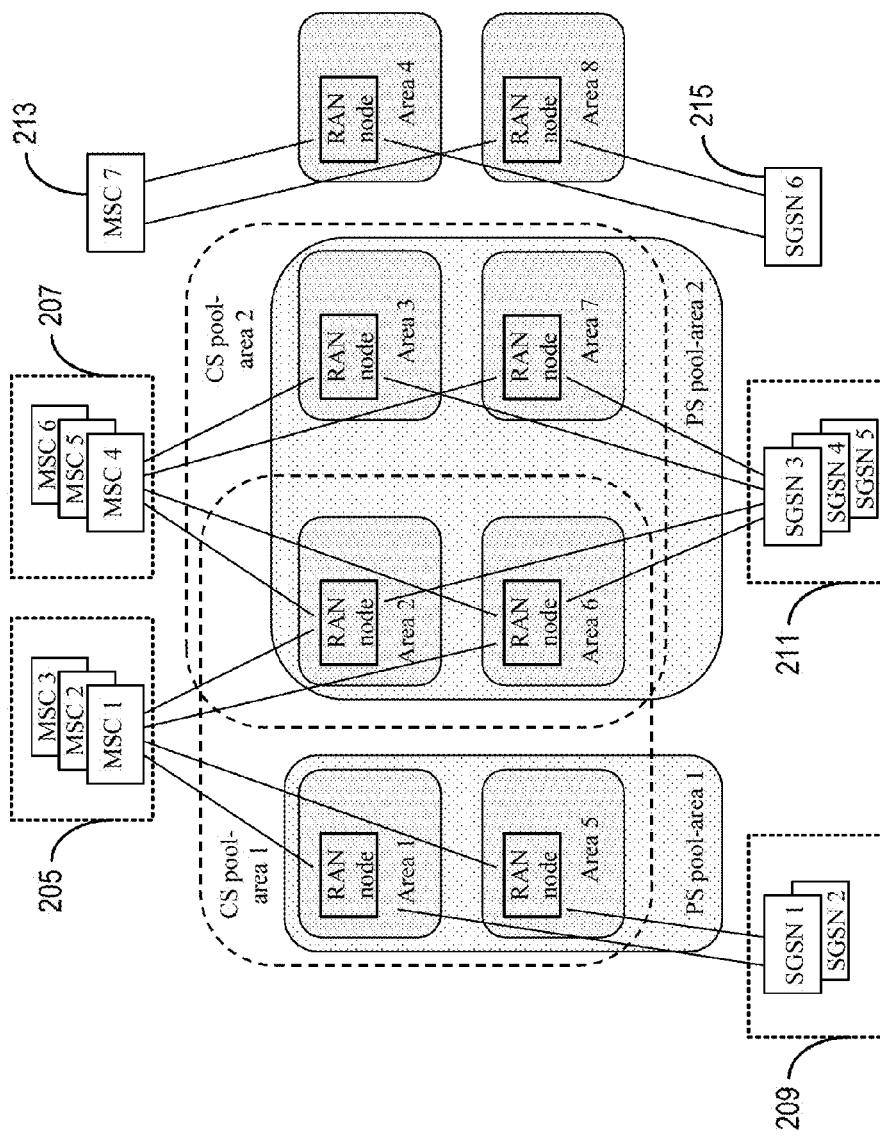
FIG. 2b is a diagram of part of a 3GPP network that includes MSC pools and SGSN pools.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

As mentioned in the Background section, it is desired to provide technology (e.g., methods, apparatuses, processor-readable storage medium, etc.) that are capable of providing a backup mechanism for establishing a reconnection between, on the one hand, an entity such as an MME and, on the other hand, an entity such as an MSC when an attempted primary reconnection mechanism experiences a problem.

In one aspect, this problem is addressed by technology that uses another MME or any other network entity, such as SGs/Sv message proxy, to relay the SGs/Sv message to the serving MSC or to an available MSC (for MME initiated restoration procedures, e.g. periodic TAU).

Similarly, another aspect of a backup mechanism involves using another MSC or any other network entity, such as an SGs/Sv message proxy, to relay the SGs/Sv message to the serving MME or to an available MME (which then forwards the SGs/Sv message to the serving MME). This can be applied, for example, in the case of MSC initiated restoration procedures (e.g., MT call).

Note that the information indicating that a given network entity supports the aforementioned technology should be exchanged among the concerning network entities (e.g., the serving MME, the relay/proxy MME, the serving MSC, the relay/proxy MSC) (i.e., so that a given node will know that its counterpart provides support for the herein-described protocol extension).

Some aspects of the enhancement (which serves as a backup) for the MME initiated SGs or Sv restoration procedure, when it is not possible to select another available MSC to perform SGs restoration, are:

1) The (already existing) serving MME keeps the UE registered but uses another MME in the MME pool, or any other network entity, as a communication link (proxy or relay) to reach an MSC at the occurrence of UE initiated events (e.g., upon receiving a periodic TAU request, a combined TAU request, a service request, UL NAS transport messages or upon SRVCC request). Any subsequent SGs/Sv signaling for this UE is then relayed via this proxy/relay MME (the one selected by the serving MME).

2) An MME experiencing total SGs/Sv failure could apply logic that moves the UE registration to another MME in the MME pool, where the selected "new" MME is not experiencing total SGs/Sv failure.

Whether to use alternative #1 or #2 is a matter of operator policy and possibly the duration of the SGs failure. Moving a UE has implications upon its PS connection and moving many UEs may also cause load distribution imbalances in the pool. The selection of an alternative MME having its SGs interface up and running may be based on Operations and Maintenance (O&M) information. Alternatively, in more advanced embodiments, once the MME detects a total SGs/Sv path failure or a path failure over an SGs interface towards the registered MSC, it sends a broadcast message (a new type of message, preferably called "SGs/Sv query request"), towards all the MMEs in the pool to query whether any other MME is available for SGs/Sv communication. In response to receipt of the SGs/Sv query request, the other MMEs in the pool report their SGs/Sv status.

Another enhancement in some but not necessarily all embodiments of the MSC initiated SGs procedure includes, in addition to what is specified in TS 23.007 chapter 26, when another MME has to be selected as the recipient of the SGs paging request:

When an MME receives an SGs-Paging-Request with the CS restoration flag, it relays the SGs paging request to the current serving MME by encapsulating the SGs paging request via a new GTPv2 message, preferably called "direct transfer", over the interface between the MMEs. Alternatively, the Relaying MME relays the SGsAP Paging Request between the end points (peers) of the S10 I/F directly by using a protocol stack different from the GTP-based protocol stack normally used at the S10 I/F. The MME will be able to find the serving MME by using the MME Fully Qualified Domain Name (FQDN), and any subsequent SGs signaling for this UE will be relayed via this relay MME (the one selected by the MSC) or any other relay MME by encapsulating the subsequent SG messages via a new GTPv2 message (preferably called "direct transfer") over the interface between the MMEs. Alternatively, the Relaying MME relays the SGs signaling between the end points (peers) of the S10 I/F directly by using a protocol stack different from the GTP-based protocol stack normally used at the S10 I/F. This is based on an aspect of exemplary embodiments in which the serving MME's FQDN is added to the SGs-Paging-Request message and other SGs messages sent from the MSC to the MME. In addition, this is based on an aspect of exemplary embodiments in which the serving MSC identifier is added to the SGs messages (e.g., SGs-Service Request and other SGs messages sent from the MME to the MSC), and is further based on a new indication in those SGs messages when sent from the MME to the MSC (e.g., SGs-Location-Update-Request, SGs-Service-Request and so on) to let the serving MSC know that the message originated from the serving MME, not from the proxy/relay MME. Note that such indication is added by the serving MME.

Upon the occurrence of a network failure in communication with the current serving MME such that it prevents the MSC where the UE is registered from performing the CS-to-PS SRVCC procedure (as defined by 3GPP by TS 23.216 in section 6.4.3.1) or from sending an SGs paging request, the affected MSC, assuming it is in an MSC Pool, applies a recovery process in which it utilizes the signaling capability from a different MSC in the pool or alternatively from any other network entity capable of serving as a relay to reach (i.e., communicate with) a suitable MME where the UE is registered. Selecting alternative MSC that has the SGs or Sv interface up and running may be based on O&M information. Alternatively, in more advanced embodiments, once the MSC detects a total SGs/Sv path failure or a path failure over the SGs interface towards the serving MME, it sends a broadcast message (a new type of message, preferably called "SGs query request/Sv query request"), towards all of the MSCs in the pool to query whether any other MSC is available for SGs or Sv communication. In response to their receipt of the SGs/Sv query request message, the other MSCs in the pool report their SGs status in a response message. This information can then be used as a basis for selection.

Other aspects of embodiments consistent with the invention will become readily apparent from the following description of exemplary embodiments which apply the principles described above to a number of typical use cases.

Examples Involving the Use of Another MME to Relay SGs Communication

In this class of examples, two different cases will be considered:

A) Receiving an MT Call paging in another MME
B) Handling of Combined Attach/TAU in an MME without any SGs I/F Each of these is described in detail below. In each of the cases, the Relaying MME may function in accordance with either of the following alternative procedures:

The Relaying MME triggers the Location Update procedure towards the MSC and as a result, in the view of the MSC, the Relaying MME becomes the SGs associated MME.

Or

The Relaying MME acts purely as a relaying node, just forwarding SGs messages between the MSC and the Serving MME. This alternative requires changes in the (as of the date of this writing) existing SGs protocol. The MSC must provide the identity of the Serving MME when sending the SGs message from the MSC to the MME and be informed of, and accept that SGs message will be relayed via another MME other than the serving MME. The MME must provide the identity of the Serving MSC when sending the SGs message from the MME to the MSC, and an indication to indicate the SGs message is relayed via another MME other than the serving MME. However, latency is reduced (due to less signaling) compared to the first alternative.

Case A1: Receiving an MT Call Paging in Another MME, with the Serving MME Continuing to Operate with the Support of Relayed Signaling.

It will be understood that the circumstances associated with this example do not mean that the serving MME is completely incapable of using the SGs interface. Rather, the serving MME may still have SGs association toward one or more other MSCs, while for a specific UE, the signaling path between the registered MSC and the serving MME is broken, so the current serving MSC selects another MME to deliver the SGs paging request (per existing requirement in 3GPP TS 23.007), or select a proxy MSC which provides a signaling path between this proxy and the serving MME.

Figure 3:
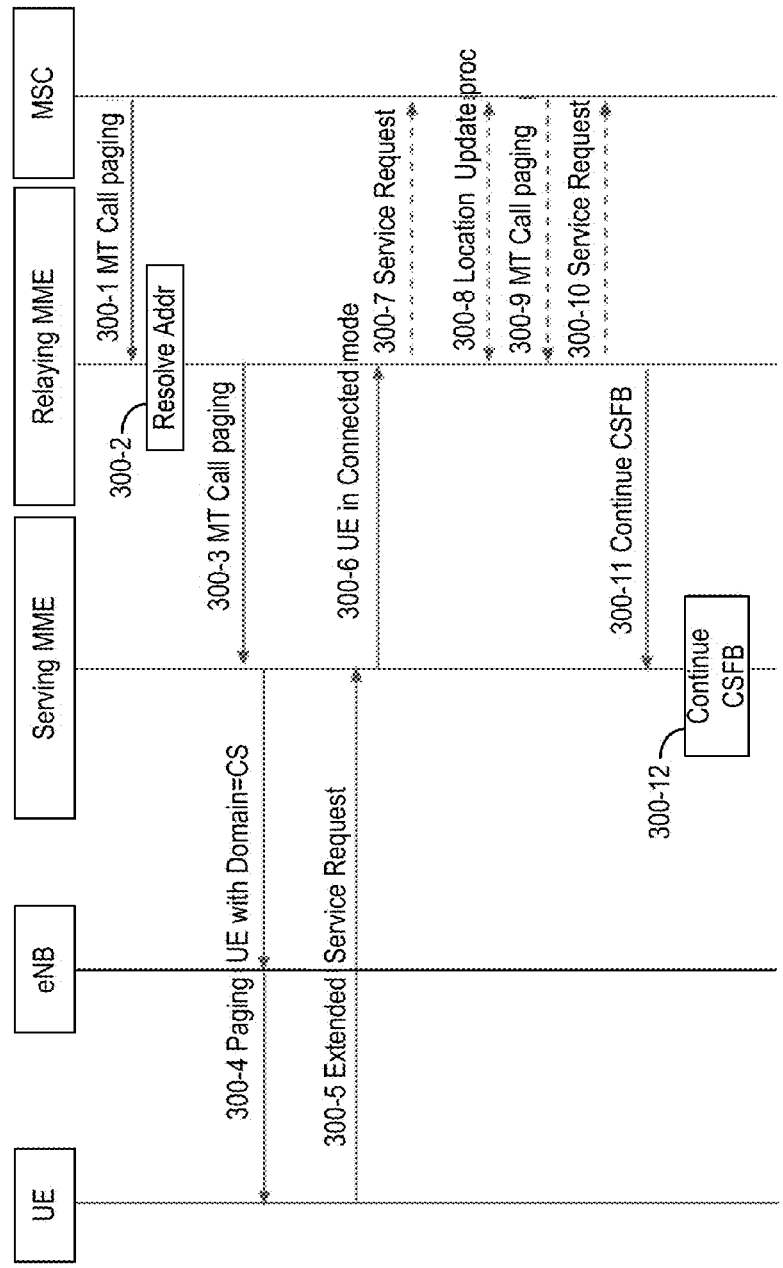
FIG. 3 is a signaling diagram in which an MT Call page is received in another MME, with the serving MME continuing to operate with the support of relayed signaling.

The signaling and related processing associated with this example will now be described with reference to the signaling diagram shown in FIG. 3.

Step 300-1: The Relaying MME receives an MT Call paging request over the SGs I/F from a pooled or non-pooled MSC, this being in response to the MSC having detected a link failure. The functionality required to make an MSC use another MME (Relaying MME) in the MME pool at MT Call is described in 3GPP TS 29.118 chapter 5.1.2.2 and 3GPP TS 23.007 chapter 26. If the MSC is serving UEs handled by other MMEs in the MME Pool, then the MSC has received the FQDN for each of the other MMEs. The MSC is able to identify other MMEs in the MME Pool based on the fact that the MME Group ID component of the FQDN is equal for all members of the MME Pool. If the MSC is currently not serving UEs from each of the other MMEs in the MME Pool, then the MSC may either use historical data (including cached FQDNs) from previous communication with MMEs from the MME Pool, or it may be configured with information about the MME Pool members. Such configuration may either be local to the node or external by means of, for example, DNS.

Step 300-2: The MSC provides the FQDN name of the Serving MME. Using the FQDN, the Relaying MME sends a DNS query to get the address of the Serving MME.

Step 300-3: The Relaying MME relays the SGsAP Paging Request over the S10 I/F to the Serving MME by encapsulating the SGs-Paging-Request into a new message (preferably called "SGs direct transfer"). Alternatively, the Relaying MME relays the SGsAP Paging Request between the end points (peers) of the S10 I/F directly by using a protocol stack different from the GTP-based protocol stack normally used at the S10 I/F.

Step 300-4: The Serving MME receives and accepts the SGsAP Paging Request and, as a consequence, sends S1AP Paging with the parameter Domain=CS.

Step 300-5: The UE, as described in 3GPP TS 23.272, responds with an Extended Service Request.

Step 300-6: The Serving MME informs the Relaying MME, via SGs direct transfer (the SGs direct transfer being a message container that carries the SGs message SGsAP-ServiceRequest), that the UE has now been paged and is in Connected mode via SGs direct transfer. This messaging can, for example, be in the form of an SGsAP-Service Request message. The general idea is that normal signaling for the paging procedure is performed. This technology differs from conventional technology, however, in that the normal paging procedure of the MME has been divided into two nodes in which 1) the serving MME performs normal paging procedure signaling at the S1-MME interface towards the eNB; and 2) the Relaying MME performs normal paging procedure signaling at the SGs interface. In order to enable the MME split new signaling has been introduced on top of the existing S10 interface. This signaling can be characterized as "tunneling" CSFB-related signaling between the two MME nodes. This "tunneling" is referred to herein as "SGs Direct Transfer." With these alterations in mind, the signaling outlined by the described steps should follow the standardized signaling for CSFB as specified by 3GPP TS 23.272 and TS 23.007. In the SGs message (e.g., SGs-Service-Request), the Serving MME indicates to the MSC that the SGs message is being relayed via another MME other than the Serving MME.

Step 300-7: As an alternative to steps 300-8 through 300-11 below (and hence shown with a dashed line), the Relaying MME forwards the SGsAP-Service Request message to the MSC. Consequently, the Serving MME continues to be the SGs associated MME in the view of the MSC (i.e., no Location Update procedure is needed) and the procedure continues in step 300-12.

Step 300-8: The relaying MME triggers the Location Update procedure to, in the view of the MSC, become the SGs associated MME.

Step 300-9: As a consequence of receiving the Location Update, the MSC retransmits the MT Call paging request. This is described in 3GPP TS 23.007 chapter 2.

Step 300-10: As a consequence of receiving the retransmitted MT Call paging request, the Relaying MME now directly answers with a Service Request. This is in accordance with the procedures specified in 3GPP TS 23.272.

Step 300-11: Finally the Relaying MME also forwards the message received at step 300-9 and to the Serving MME, thereby triggering the Serving MME's continuing the CSFB procedure.

Step 300-12: The CSFB procedure continues as, for example, specified in 3GPP TS 23.272.

Case A2: Receiving an MT Call Paging in Another MME, with the Serving MME Using Initial Relay Signaling Only.

In embodiments that include an MSC pool and in which the Serving MME has at least one working SGs I/F, the Serving MME may use another MSC for re-registration of the UE. The Relaying MME learns about what it is being instructed to do either via an explicit message sent from the serving MME to the relaying MME indicating the serving MME will continue with the MT call by performing CS registration towards another available MSC, or implicitly, meaning that the relaying MME doesn't receive any SGs direct transfer from the serving MME.

In such a case, the Relaying MME inhibits steps 300-8 through 300-10 as described above.

Figure 4:
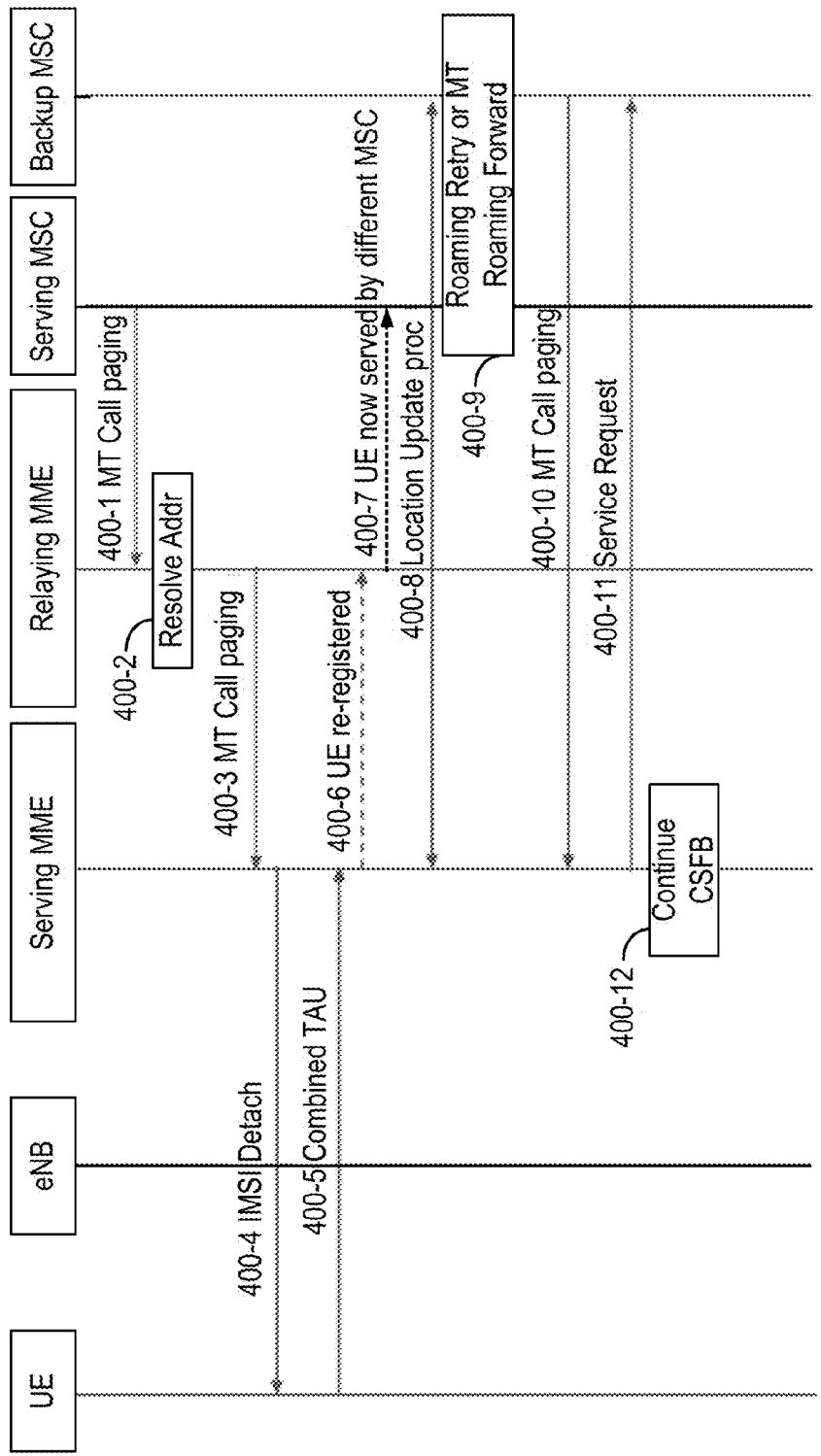
FIG. 4 is a signaling diagram in which an MT Call page is received in another MME, with the serving MME using initial relay signaling only.

The signaling and related processing associated with this example will now be described with reference to the signaling diagram shown in FIG. 4.

Step 400-1: An MT Call paging request is received over the SGs I/F from a pooled MSC, this being in response to the MSC having detected a link failure. The functionality required to make an MSC use another MME (Relaying MME) in the MME pool at MT Call is described in, for example, 3GPP TS 29.118 chapter 5.1.2.2 and 3GPP TS 23.007 chapter 26. If the MSC is serving UEs handled by other MMEs in the MME Pool, then the MSC has received the FQDN for each of the other MMEs. The MSC is able to identify other MMEs in the MME Pool based on the fact that the MME Group ID component of the FQDN is equal for all members of the MME Pool. If the MSC is currently not serving UEs from each of the other MMEs in the MME Pool, then the MSC may either use historical data (including cached FQDNs) from previous communication with MMEs from the MME Pool, or it may be configured with information about the MME Pool members. Such configuration may either be local to the node or external by means of, for example, DNS.

Step 400-2: The MSC provides the FQDN name of the Serving MME. Using the FQDN, the Relaying MME sends a DNS query to get the address of the Serving MME.

Step 400-3: The Relaying MME relays the SGsAP Paging Request over the S10 I/F to the Serving MME using the newly defined "SGs Direct Transfer".

Step 400-4: As the Serving MME has at least one working SGs I/F towards another MSC in the MSC pool, it uses IMSI Detach to detach the UE in order to re-register the UE in another MSC.

Step 400-5: The UE issues a Combined TAU request as described in, for example, 3GPP TS 24.301 chapter 5.5.2.3.2.

Step 400-6: The Serving MME informs the Relaying MME that the UE will be handled by the Serving MME through re-registration, thereby inhibiting any further actions by the Relaying MME. Strictly speaking, this step is not needed because the Relay MME is stateless. Nonetheless, it can be beneficial to perform this step as well as the next.

Step 400-7: The Relaying MME in turn informs the Serving MSC that the UE will be registered by a different MSC. This information enables the currently serving MSC to stop performing paging retries, which it otherwise would do in the absence of a response.

Step 400-8: The Serving MME triggers the Location Update procedure to re-register the UE in the Backup MSC.

Step 400-9: In response to receiving the Location Update message, the Backup MSC uses either an MT Roaming Retry or an MT Roaming Forward in order to trigger a transfer of the MT Call paging request from the Serving MSC to the Backup MSC. This action is described in 3GPP TS 23.018 and 3GPP TS 23.007 chapter 26.

Step 400-10: As a consequence of the MT Call paging request being transferred from the Serving MSC to the Backup MSC, the MT Call paging request is retransmitted by the Backup MSC towards the Serving MME. This behavior is in accordance with procedures specified in 3GPP TS 23.007 chapter 26.

Step 400-11: In response to receiving the MT Call paging request, the Serving MME sends a Service Request. This is in accordance with procedures specified in 3GPP TS 23.272.

Step 400-12: Finally, the CSFB procedure is continued in the usual manner. See, for example, 3GPP TS 23.272 for further details.

Figure 5:
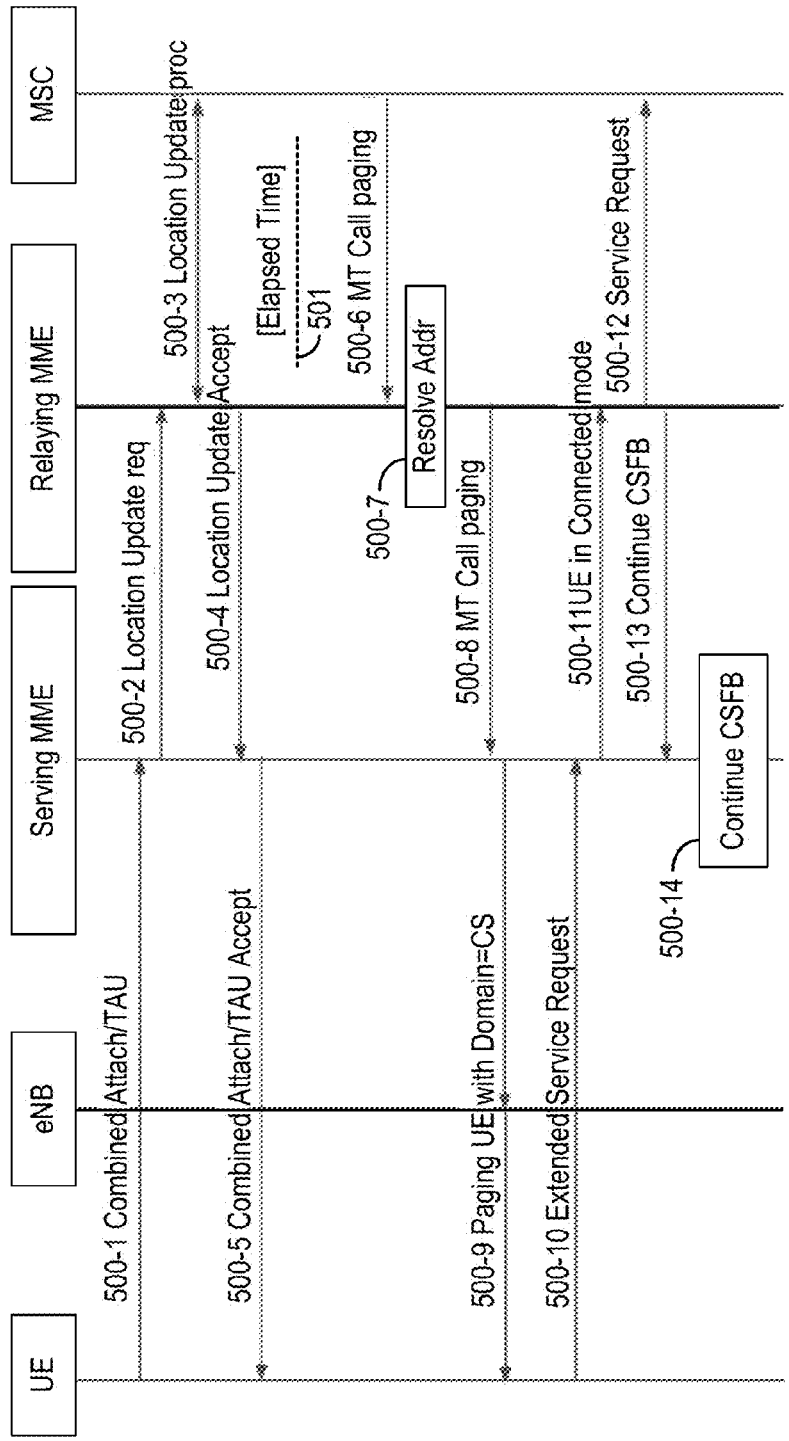
FIG. 5 is a signaling diagram in which a Combined Attach/TAU is handled in an MME without any SGs I/F at the Serving MME and a later MT Call occurs.

Case B: Handling of Combined Attach/TAU in an MME without any SGs I/F at the Serving MME and Later MT Call The signaling and related processing associated with this example will now be described with reference to the signaling diagram shown in FIG. 5.

Step 500-1: A Combined Attach/TAU request is sent by a UE and received in the Serving MME which, in this example, is the MME with total SGs I/F failure. This process is in accordance with, for example, 3GPP TS 23.272.

Step 500-2: The Serving MME may get information about SGs I/F status from all other MMEs in the pool and, based on this information, selects an MME (Relaying MME) that has a working SGs I/F towards the associated MSC. The Serving MME then sends an SGsAP Location Update Request to the selected Relaying MME by encapsulating the SGsAP Location Update Request into a new message, preferably called "direct transfer". Alternatively, the SGsAP Location Update Request is sent between the end points (peers) of the S10 I/F directly by using a protocol stack different from the GTP-based protocol stack normally used at the S10 I/F. The serving MME includes the MSC identifier and an indication to the MSC that the SGs message is being relayed via another MME other than the Serving MME.

In alternative embodiments, the Serving MME may obtain information about the SGs I/F status by sending a broadcast message to query all other MMEs (preferably in parallel) in order to find a suitable Relaying MME.

Step 500-3: The Relaying MME performs the Location Update procedure to register (or in some cases, re-register) the UE in the MSC, so that from the point of view of the MSC, the relaying MME becomes the serving MME. The Location Update procedure can be, for example, in accordance with procedures described in 3GPP TS 23.272 and 29.118.

As an alternative, the Relaying MME may inform the MSC about the identity of the Serving MME and further inform the MSC that that it (i.e., the Relaying MME) is only relaying the SGs messages.

Step 500-4: The Relaying MME sends the Location Update Accept message to the Serving MME.

Step 500-5: The Serving MME sends a Combined Attach/TAU accept message to the UE. This is in accordance with procedures defined in 3GPP TS 23.272.

At some later point in time (see elapsed time 501) an MT Call paging request is sent by a pooled or non-pooled MSC over the SGs I/F towards the Relaying MME as this is the associated MME as seen from the MSC. In other words, the Relaying MME presents itself as the Serving MME to the Serving MSC. An advantage of this approach is that it provides a mechanism whereby a legacy MSC may be able to interwork with a Relaying MME.

It is noted that a different approach involves making the Serving MSC aware that the Relay MME is a Relay MME. In response to this information, the Serving MSC can use MME FQDN to select an alternative MME from the MME Pool. This alternative approach has the advantage of being more robust because the Serving MSC is able to use any arbitrary MME from the MME Pool to reach the Serving MME with application layer signaling.

The use case can therefore be for an initial combined attach or TAU procedure, where the serving MME has not yet established SGs association for the given UE, so that the serving MME can use a relay MME to accomplish the registration procedure. It would be similar to the MT call use case:

1) The relay MME may behave as a true relay, just forwarding the message by extracting the SGs message included in SGs direct transfer and then sending the extracted SGs message to an MSC, so that the MSC will know that the UE is under control of the serving MME, not the relay MME; or
2) The relay MME behaves as the serving MME, so that the MSC believes that the UE is under control of the relay MME without being aware that the relay MME is actually a relay MME. Consequently, for the subsequent MT call, for case 1, the MSC may select another MME as relay MME; for case 2, the MSC will directly communicate with this relay MME because it believes it is the serving MME for the UE.

Step 500-6: The Relaying MME receives an MT Call paging request from a pooled or non-pooled MSC. This is performed in accordance with procedures described in 3GPP TS 23.272.

Alternatively, the MSC may use the alternative message and information received in step 500-3 to relay the MT Call paging request to the Serving MME via the Relaying MME (i.e., using the Relaying MME only for relaying purposes).

Step 500-7: The Relaying MME remembers the identity of the serving MME for which it previously relayed SGsAP Location Update signaling for the IMSI, and selects the same MME.

Or in accordance with another alternative, the MSC provides the FQDN name of the Serving MME. Via a DNS query, the FQDN name is used by the Relaying MME to get the address of the Serving MME.

Step 500-8: The Relaying MME relays the SGsAP Paging Request over the S10 I/F to the Serving MME.

Step 500-9: The Serving MME receives and accepts the SGsAP Paging Request and as a consequence, sends S1AP Paging message with Domain=CS.

Step 500-10: The UE responds with an Extended Service Request message. This is in accordance with 3GPP TS 23.272.

Step 500-11: The Serving MME informs the Relaying MME that the UE has now been paged and is in Connected mode. This informing step can be in the form of an SGsAP-Service Request message.

Step 500-12: The Relaying MME answers the MSC with an SGsAP Service Request. Although the SGsAP Service Request is, itself, known, its use here is distinguishable from conventional technology at least in that it is sent via a relaying MME and not directly from the SGs associated MME.

Step 500-13: Finally, the Relaying MME communicates with the Serving MME so as to cause it to continue the CSFB procedure.

Step 500-14: Accordingly, the Serving MME continues the CSFB procedure as described in 3GPP TS 23.272.

Figure 6:
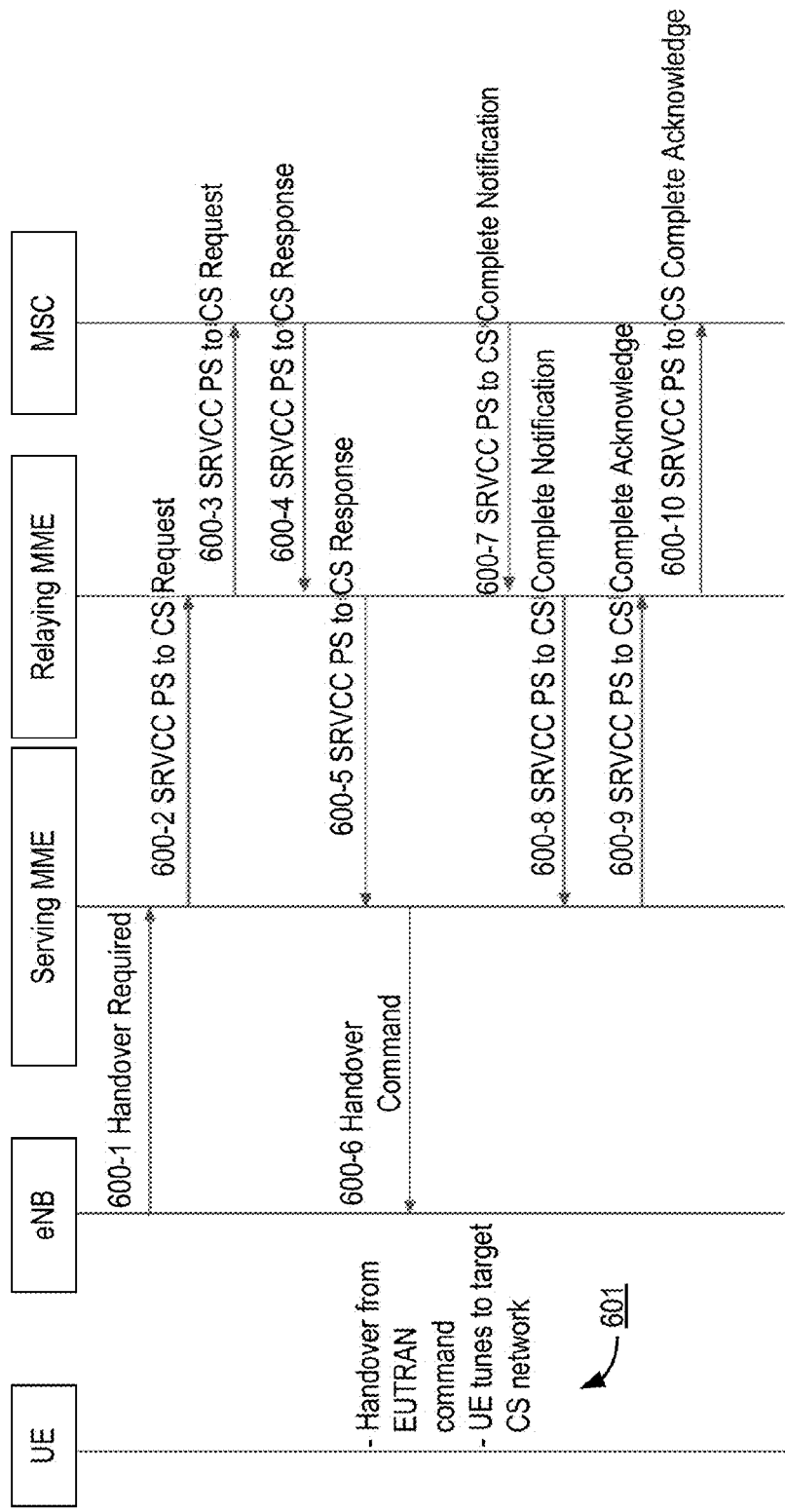
FIG. 6 is a signaling diagram illustrating the use of another MME to relay Sv communication when there is no functional Sv I/F at the Serving MME.

An Example Involving the Use of Another MME to Relay Sv Communication when there is No Functional Sv I/F at the Serving MME The relevant signaling and related processing associated with this example will now be described with reference to the signaling diagram shown in FIG. 6. It is noted that, for the sake of clarity, non-relevant aspects have been omitted, such as the interaction with the SGSN.

Step 600-1: At some point while it is serving a UE, an eNB sends a Handover Required message to the Serving MME. This includes an SRVCC HO indication. This signaling is in accordance with processes defined in 3GPP TS 23.216.

Step 600-2: In some embodiments, the Serving MME obtains information about Sv I/F status from all of the other MMEs in the pool and, based on this information, selects an MME (Relaying MME) that has a working Sv I/f towards the selected MSC. The SRVCC PS to CS Request message, including identity of the selected MSC, is then sent to the Relaying MME.

The Serving MME may obtain information about Sv I/F status by other means or by trying (preferably in parallel) all other MMEs (e.g., by sending a broadcast message to query all other MMEs) in order to find a suitable Relaying MME.

Step 600-3: The Relaying MME relays the SRVCC PS to CS Request message to the MSC. The steps for carrying out the SRVCC PS to CS Request procedure are described in 3GPP TS 23.216. However, the conventional technology does not take into account the use of a different (Relaying) MME acting on behalf of the Serving MME as part of the process. As part of accommodating this difference, the Relaying MME informs the MSC that it (i.e., the Relaying MME) is operating only as a relay of Sv messages, and informs the MSC of the identity of the Serving MME. It will be observed that, in its role as merely a relayer of information, the Relaying MME is stateless.

Step 600-4: The MSC sends the SRVCC PS to CS Response message to the Relaying MME.

Step 600-5: The Relaying MME relays the SRVCC PS to CS Response message to the Serving MME.

Step 600-6: The Serving MME sends a Handover Command message to the eNB. This aspect is carried out in accordance with procedures described in 3GPP TS 23.216.

Step 600-7: After the UE, as part of performing a handover from EUTRAN, tunes to 2G or 3G radio services in the CS domain (see 601), the MSC sends an SRVCC PS to CS Complete Notification to the Relaying MME. This message includes the identity of the Serving MME.

Step 600-8: The Relaying MME relays the SRVCC PS to CS Complete Notification to the Serving MME.

Step 600-9: The Serving MME responds with a SRVCC PS to CS Complete Acknowledge to the Relaying MME.

Step 600-10: The Relaying MME relays the SRVCC PS to CS Complete Acknowledge to the MSC.

Various embodiments that are consistent with the invention provide a number of advantages over conventional error handling technology. Advantages that are present in some embodiments include, when the MME has lost SGs I/F connectivity, the ability to keep the UE registered. In instances in which the MME has lost its Sv I/F connectivity, some embodiments make it possible to perform an SRVCC.

Aspects that relate to these advantages are provisions that allow the MME to serve the UE via another MME in the MME pool.

The resulting impact from the behavior change (compared to conventional technology) is:

No spike in NAS signaling: Since the UE remains registered by the same MME, there is no spike in UE signaling to UEs registered by the MME.

May be isolated so as to impact the MME pool only: The various aspects are contained entirely within the MME Pool. It may be used to extend and strengthen the MME Pool concept.

May be used to provide an MSC Pool with relaying capabilities: This enables the MSCs of the MSC Pool to use alternative routes to successfully perform signaling for MT services.

No spike in signaling load to HSS: Since the UEs remains registered by the same MME, there is no burst of UE movement from an impacted MME to other MMEs and hence no signaling burst of UE registrations to the HSS either.

Avoiding IMSI based paging with Core Network domain set to PS: This makes it possible to avoid seriously impacting the existing PS service.

When a Relay MME functions as a true relay, the signaling for CS re-registration is avoided.

Figure 7:
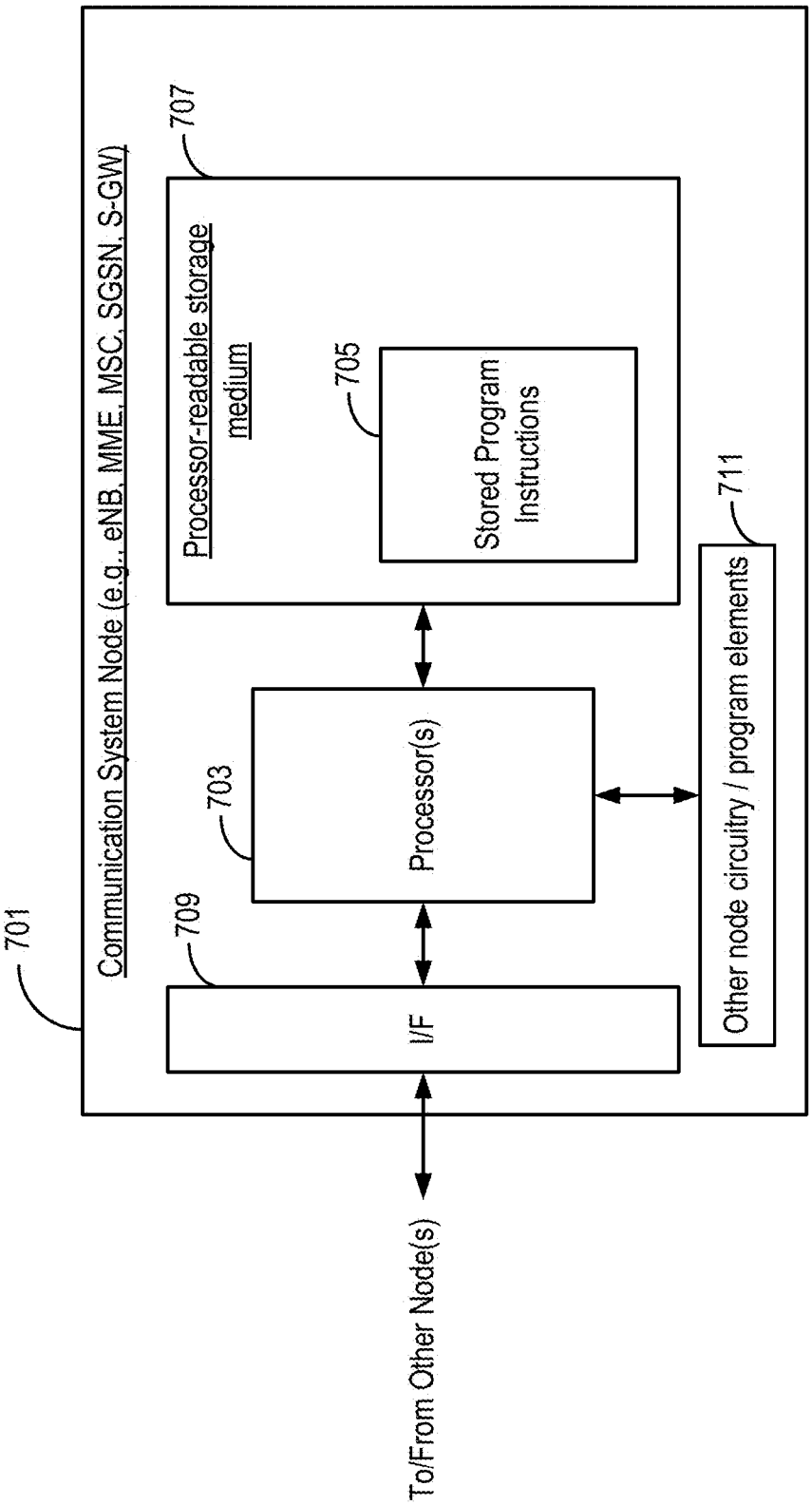
FIG. 7 is a block diagram of a generic node that can be any one of an eNB, MME, or MSC in exemplary embodiments consistent with the invention.

In every embodiment, the various aspects may be carried out by interconnected nodes (e.g., the eNBs, MMEs, MSCs) such as the generic node 701 depicted in FIG. 7. Each node includes one or more processors 703 and a method may be performed based on a computer program comprising instructions 705 that, when executed by the one or more processors 703, carry out performance of a method consistent with that node's role as described above with respect to any one or combination of embodiments (e.g., when the node is a Serving MME, it carries out steps consistent with Serving MME operation as described above; when the node is a Relaying MME, it carries out steps consistent with Relaying MME operation as described above; when the node is an MSC, it carries out steps consistent with MSC steps as described above, etc.). The program 705 is executable on the one or more programmable processors 703. The application program may be implemented on a high-level procedural or object-oriented programming language, or in assembly or machine language if desired. In any case, the language may be compiled or an interpreted language. The program may be a full installation program, or an update program. In the latter case, the program is an update program that updates a programmable device, previously programmed performing parts of the method, to a state wherein the device is suitable for performing the whole method.

The program 705 may be recorded on a processor-readable data storage medium 707. The data storage medium 707 may be any memory adapted for recording computer instructions. The data storage medium may thus be any form of nonvolatile memory, including by way of example, and without limitation, semiconductor memory devices, such as EPROM, EEPROM, and flash memory devices; magnetic disks such as internal hard disks and removable disks; magneto-optical disks; and CD-ROM disks. The storage medium 707 is operatively coupled to the one or more processors 703 to enable the processor(s) 703 to both read and, in some cases, write data and instructions into the storage medium 707.

The node 701 further includes an interface 709 operatively coupled to the one or more processors 703 so as to enable communication between the node 701 and other nodes or network elements (not shown). The interface 709 may, for example and without limitation, operate as any one or more of the following interfaces: S1-MME; S3; S4, S6a; S10; S11; SGs; Sv.

Depending on the type of node being considered, the node 701 may include other circuit and/or program elements 711 that may also be operatively coupled to the one or more processors 703. Description of any such other circuit and/or program elements 711 is both known to those of ordinary skill in the art and also beyond the scope of Applicants' embodiments, and therefore need not be described here.

Figure 8:
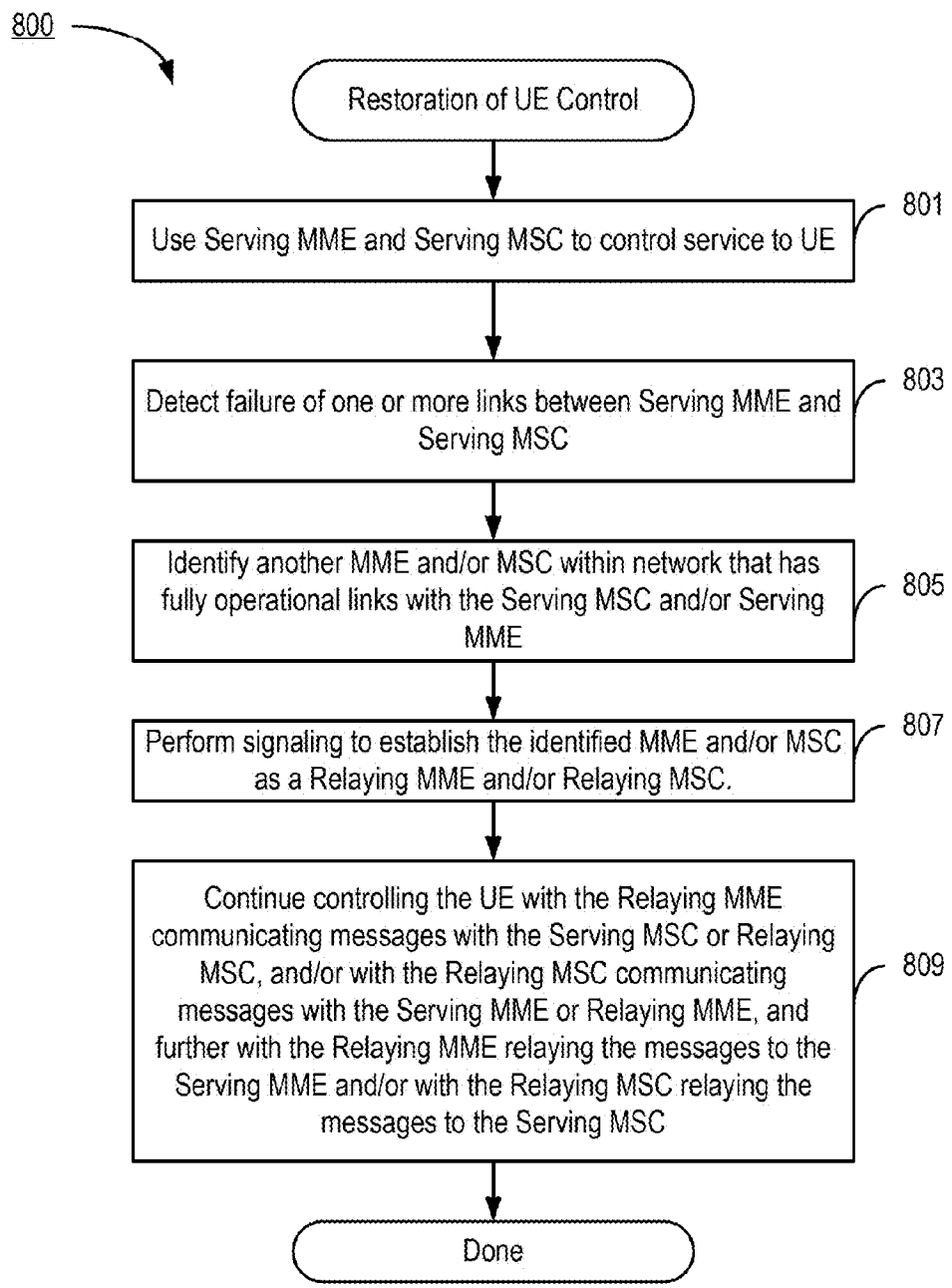
FIG. 8 is, in one respect, a flow chart of steps/processes performed by circuitry in accordance with some but not necessarily all exemplary embodiments of the invention for the purpose of restoring the network's UE control capability.

The reader will appreciate from the description presented herein that aspects of exemplary embodiments include, without limitation, technology (e.g., methods, apparatus, processor-readable storage media) that restores user equipment control in the presence of communication link failure between a network node that provides control of packet switched connections and a network node that provides control of circuit switched connections. FIG. 8 is, in one respect, a flow chart of steps/processes performed by circuitry in accordance with some but not necessarily all exemplary embodiments of the invention for the purpose of restoring the network's UE control capability. In another respect, FIG. 8 can be considered to depict means 800 for restoring the network's UE control capability, wherein the depicted blocks represent circuitry configured to perform the described functions.

In some but not necessarily all embodiments, a communication service is provided to a UE by a Serving MME and a Serving MSC in a communication system (step 801). At some point, it is detected that one or more links that enable communication between the Serving MME and the Serving MSC have failed (step 803). Another MME and/or MSC are/is identified within the network that have/has fully operational links with the Serving MSC and/or Serving MME (step 805). Signaling is performed to establish the identified MME and/or MSC as a Relaying MME and/or Relaying MSC (step 807). Control of the UE continues with the Relaying MME communicating messages with the Serving MSC or Relaying MSC, and/or with the Relaying MSC communicating messages with the Serving MME or Relaying MME, and further with the Relaying MME relaying the messages to the Serving MME and/or with the Relaying MSC relaying the messages to the Serving MSC (step 809).

It will be appreciated that the particular signaling defined by step 807, and the UE control functionality of step 809 can be, for example, in accordance with any of the embodiments described above with respect to FIGS. 3, 4, 5, and/or 6.

The various aspects of embodiments consistent with the invention have been described with respect to MMEs, SGSNs, and MSCs. However, the use of these examples is not intended to limit the scope of the various inventive aspects. For example, the same principles can be applied to the S11 interface, which is between the MME and Serving Gateway (S-GW), and also to the S4 interface, which is between the SGSN and the S-GW. In particular, when the S-GW detects that the MME or SGSN is not reachable, for Downlink Data Notification message is triggered due to receiving Downlink data at the user plane or due to receiving control plane signaling messages (e.g., Create/Update/Delete bearer request message), it should include the Serving MME's FQDN (this is the MME's identifier) or the Serving SGSN's FQDN (this is the SGSN's identifier) in the Downlink Data Notification message and send it to another alternative MME or SGSN, to allow such proxy MME or SGSN to transfer these messages to the correct MME or SGSNs.

Figure 9:
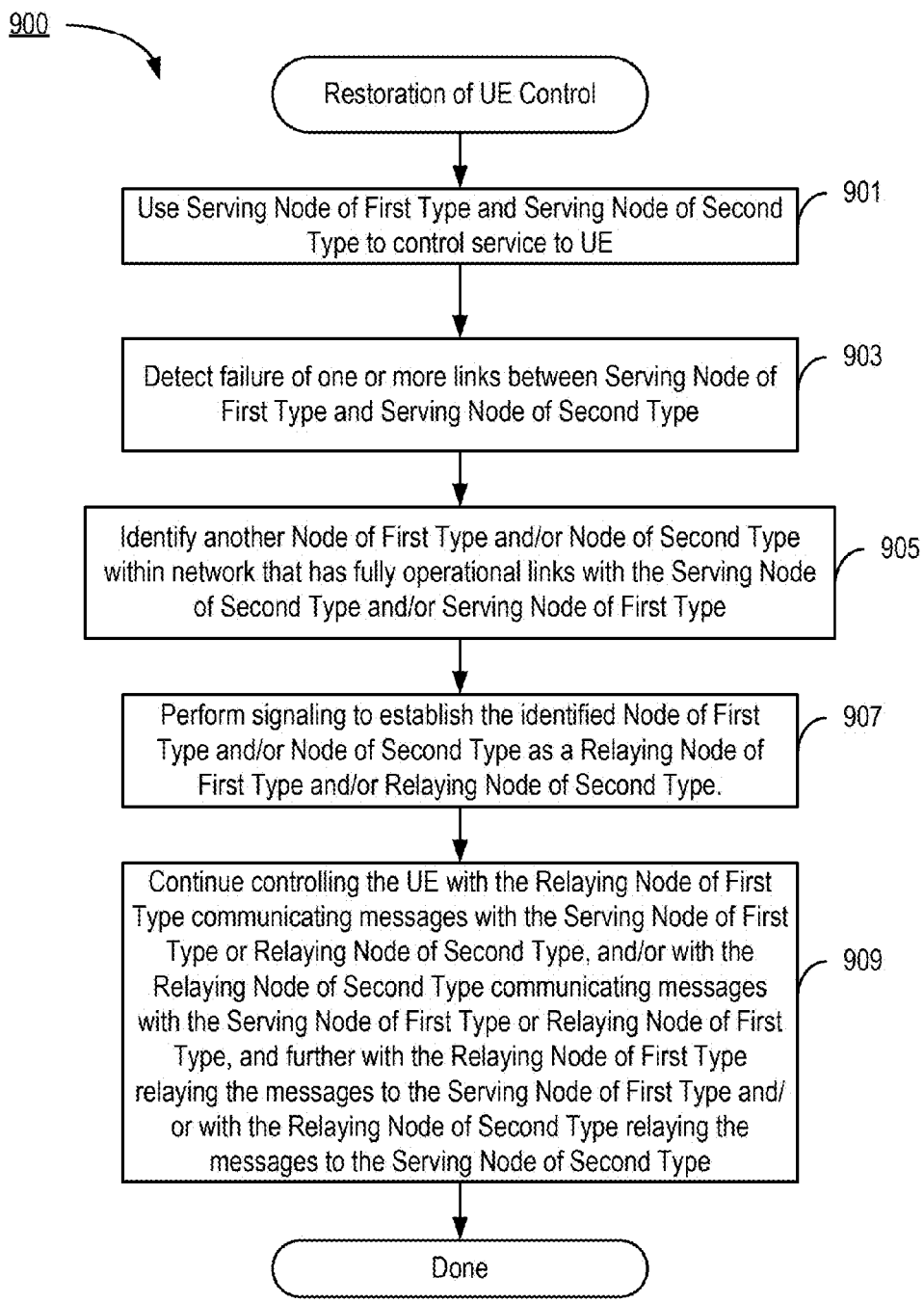
FIG. 9 is, in one respect, a flow chart of steps/processes performed by circuitry in accordance with some but not necessarily all exemplary embodiments of the invention for the purpose of restoring the network's UE control capability.

Because some of the same concepts and principles are applied regardless of node type, embodiments of the invention can be described even more generally in terms of a Serving Node of a First Type being unreachable by a Node of a Second type. It will be appreciated that the Node of the First Type and also the Node of the Second Type are not of the same type (e.g., they are not both MME's) but otherwise can be selected from at least any of the following Nodes:
MMEs
MSCs
SGSNs
S-GWs
eNBs To illustrate such embodiments, FIG. 9 is, in one respect, a flow chart of steps/processes performed by circuitry in accordance with some but not necessarily all exemplary embodiments of the invention for the purpose of restoring the network's UE control capability. In another respect, FIG. 9 can be considered to depict means 900 for restoring the network's UE control capability, wherein the depicted blocks represent circuitry configured to perform the described functions.

In some but not necessarily all embodiments, a communication service is provided to a UE by a Serving Node of a First Type and a Serving Node of a Second Type in a communication system (step 901). At some point, it is detected that one or more links that enable communication between the Serving Node of the First Type and the Serving Node of the Second Type have failed (step 903). Another Node of the First Type and/or Node of the Second Type are/is identified within the network that have/has fully operational links with the Serving Node of the Second Type and/or Serving Node of the First Type (step 905). Signaling is performed to establish the identified Node of the First Type and/or Node of the Second Type as a Relaying Node of the First Type and/or Relaying Node of the Second type (step 907). Control of the UE continues with the Relaying Node of the First Type communicating messages with the Serving Node of the Second Type or Relaying Node of the Second Type, and/or with the Relaying Node of the Second Type communicating messages with the Serving Node of the First Type or Relaying Node of the First Type, and further with the Relaying Node of the First type relaying the messages to the Serving Node of the First Type and/or with the Relaying Node of the Second Type relaying the messages to the Serving Node of the Second Type (step 909).

It will be appreciated that the particular signaling defined by step 907, and the UE control functionality of step 909 can be, for example, in accordance with any of the embodiments described above with respect to FIGS. 3, 4, 5, and/or 6.

The various embodiments described herein illustrate interactions between various network elements. It will be appreciated that the inventive aspects are not limited only to complete systems, however. Rather, it will be appreciated that some embodiments consistent with the invention take the form of existing network components that have been enhanced to further support the functionality described herein, which functionality has been until now unknown.

The reader is referred to the following standardization documents for further information about some of the processes/signaling described herein:
3GPP TS 23.401 v12.2.0 2013-09
3GPP TS 23.272 v12.0.0 2013-09
3GPP TS 23.216 v12.0.0 2013-09
3GPP TS 29.274 v12.2.0 2013-09
3GPP TS 29.118 v12.2.0 2013-09
3GPP TS 23.007 v12.1.0 2013-09

The invention has been described with reference to particular embodiments. However, it will be readily apparent to those skilled in the art that it is possible to embody the invention in specific forms other than those of the embodiment described above. Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of restoring user equipment control in the presence of communication link failure between a network node that provides control of packet switched connections and a network node that provides control of circuit switched connections, the method comprising:

using a serving node of a first type in communication with a node of a second type to provide a communication service to a user equipment, wherein the serving node of the first type controls one of packet switched connections and circuit switched connections, and the node of the second type controls a different one of packet switched connections and circuit switched connections;

detecting a failure of one or more links that enable communication between the serving node of the first type and the node of the second type;

identifying another node, wherein the identified node is to be used as a first relaying node and is one of:
another node of the first type that has fully operational links with the node of the second type; and
another node of the second type that has fully operational links with the serving node of the first type;

performing signaling to establish the identified node as the first relaying node; and continuing to provide the communication service to the user equipment by using the first relaying node to communicate one or more messages between the serving node of the first type and the node of the second type.

2. The method of claim 1, wherein:

the serving node of the first type is a serving mobility management entity;

the first relaying node is a relaying mobility management entity; and the serving and relaying mobility management entities are in a same mobility management entity pool.

3. The method of claim 2, wherein:

the node of the second type is a serving mobile switching center.

4. The method of claim 2, wherein:

the node of the second type is a relaying mobile switching center that communicates messages between the relaying mobility management entity and a serving mobile switching center.

5. The method of claim 1, wherein:

the serving node of the first type is a serving mobile switching center;

the first relaying node is a relaying mobile switching center; and the serving and relaying mobile switching centers are in a same mobile switching center pool.

6. The method of claim 5, wherein:

the node of the second type is a serving mobility management entity.

7. The method of claim 5, wherein:

the node of the second type is a relaying mobility management entity that communicates messages between the relaying mobile switching center and a serving mobility management entity.

8. The method of claim 1, wherein:

detecting the failure of one or more links that enable communication between the serving node of the first type and the node of the second type is performed by the serving node of the first type;

identifying said another node, wherein the identified node is to be used as the first relaying node, is performed by the serving node of the first type;

the first relaying node is of the second type;

the node of the second type is a serving node of the second type; and continuing to provide the communication service to the user equipment by using the first relaying node to communicate one or more messages between the serving node of the first type and the node of the second type comprises:

the first relaying node relaying a message from the serving node of the first type to the serving node of the second type, wherein the message indicates that the serving node of the second type should continue with the communication service to the user equipment by re-registering the user equipment with a different node of the first type.

9. The method of claim 8, wherein:

the serving node of the first type is a serving mobile switching center;

the first relaying node is a relaying mobility management entity;

the serving node of the second type is a serving mobility management entity; and the different node of the first type is a different mobile switching center.

10. The method of claim 8, wherein the first relaying node relaying the message from the serving node of the first type to the serving node of the second type comprises:

tunneling Circuit Switched FallBack-related signaling between the first relaying node and the serving node of the second type.

11. The method of claim 1, wherein performing signaling to establish the identified node as the first relaying node comprises:

tunneling Circuit Switched FallBack-related signaling between the first and second mobility management entities.

12. The method of claim 11, wherein performing signaling to establish the identified node as the first relaying node comprises:

the first relaying node triggering a procedure that causes the first relaying node to become, from a point of view of the node of the second type, an associated node of the first type in place of the serving node of the first type.

13. The method of claim 1, wherein;

the first relaying node is a relaying node of the first type; and performing signaling to establish the identified node as the first relaying node comprises:

signaling to the node of the second type that messages between the node of the second type and the serving node of the first type are via the first relaying node.

14. The method of claim 13, wherein:

the node of the second type is a relaying node of the second type that communicates messages between the first relaying node and a serving node of the second type; and the method comprises:

the relaying node of the second type signaling to the serving node of the second type that messages between the serving node of the second type and the serving node of the first type are via the first relaying node.

15. The method of claim 1, wherein continuing to provide the communication service to the user equipment by using the first relaying node to communicate one or more messages between the serving node of the first type and the node of the second type comprises one or both of:

the serving node of the first type sending, to the first relaying node, one or more messages that are directed to the serving node of the second type; and the serving node of the first type receiving, from the first relaying node, one or more messages that originated from the node of the second type.

16. An apparatus configured to restore user equipment control in the presence of communication link failure between a network node that provides control of packet switched connections and a network node that provides control of circuit switched connections, the apparatus comprising:

circuitry configured to use a serving node of a first type in communication with a node of a second type to provide a communication service to a user equipment, wherein the serving node of the first type controls one of packet switched connections and circuit switched connections, and the node of the second type controls a different one of packet switched connections and circuit switched connections;

circuitry configured to detect a failure of one or more links that enable communication between the serving node of the first type and the node of the second type;

circuitry configured to identify another node, wherein the identified node is to be used as a first relaying node and is one of:
  another node of the first type that has fully operational links with the node of the second type; and
  another node of the second type that has fully operational links with the serving node of the first type;

circuitry configured to perform signaling to establish the identified node as the first relaying node; and circuitry configured to continue to provide the communication service to the user equipment by using the first relaying node to communicate one or more messages between the serving node of the first type and the node of the second type.

17. The apparatus of claim 16, wherein:
the serving node of the first type is a serving mobility management entity;
the first relaying node is a relaying mobility management entity; and
the serving and relaying mobility management entities are in a same mobility management entity pool.

18. The apparatus of claim 17, wherein:
the node of the second type is a serving mobile switching center.

19. The apparatus of claim 17, wherein:
the node of the second type is a relaying mobile switching center that communicates messages between the relaying mobility management entity and a serving mobile switching center.

20. The apparatus of claim 16, wherein:
the serving node of the first type is a serving mobile switching center;
the first relaying node is a relaying mobile switching center; and
the serving and relaying mobile switching centers are in a same mobile switching center pool.

21. The apparatus of claim 20, wherein:
the node of the second type is a serving mobility management entity.

22. The apparatus of claim 20, wherein:
the node of the second type is a relaying mobility management entity that communicates messages between the relaying mobile switching center and a serving mobility management entity.

23. The apparatus of claim 16, wherein:
the serving node of the first type comprises the circuitry configured to detect the failure of one or more links that enable communication between the serving node of the first type and the node of the second type;
the serving node of the first type comprises the circuitry configured to identify said another node, wherein the identified node is to be used as the first relaying node;
the first relaying node is of the second type;
the node of the second type is a serving node of the second type; and
the circuitry configured to continue to provide the communication service to the user equipment by using the first relaying node to communicate one or more messages between the serving node of the first type and the node of the second type comprises:
  circuitry in the first relaying node configured to relay a message from the serving node of the first type to the serving node of the second type, wherein the message indicates that the serving node of the second type should continue with the communication service to the user equipment by re-registering the user equipment with a different node of the first type.

24. The apparatus of claim 23, wherein:
the serving node of the first type is a serving mobile switching center;
the first relaying node is a relaying mobility management entity;
the serving node of the second type is a serving mobility management entity; and
the different node of the first type is a different mobile switching center.

25. The apparatus of claim 23, wherein the circuitry in the first relaying node configured to relay the message from the serving node of the first type to the serving node of the second type comprises:
circuitry configured to tunnel Circuit Switched FallBack-related signaling between the first relaying node and the serving node of the second type.

26. The apparatus of claim 16, wherein the circuitry configured to perform signaling to establish the identified node as the first relaying node comprises:
circuitry configured to tunnel Circuit Switched FallBack-related signaling between the first and second mobility management entities.

27. The apparatus of claim 26, wherein the circuitry configured to perform signaling to establish the identified node as the first relaying node comprises:
circuitry in the first relaying node configured to trigger a procedure that causes the first relaying node to become, from a point of view of the node of the second type, an associated node of the first type in place of the serving node of the first type.

28. The apparatus of claim 16, wherein;
the first relaying node is a relaying node of the first type; and
the circuitry configured to perform signaling to establish the identified node as the first relaying node comprises:
  circuitry configured to signal to the node of the second type that messages between the node of the second type and the serving node of the first type are via the first relaying node.

29. The apparatus of claim 28, wherein:
the node of the second type is a relaying node of the second type that communicates messages between the first relaying node and a serving node of the second type; and
the apparatus comprises:
circuitry in the relaying node of the second type configured to signal to the serving node of the second type that messages between the serving node of the second type and the serving node of the first type are via the first relaying node.

30. The apparatus of claim 16, wherein the circuitry configured to continue to provide the communication service to the user equipment by using the first relaying node to communicate one or more messages between the serving node of the first type and the node of the second type comprises one or both of:
circuitry in the serving node of the first type configured to send, to the first relaying node, one or more messages that are directed to the serving node of the second type; and
circuitry in the serving node of the first type configured to receive, from the first relaying node, one or more messages that originated from the node of the second type.

31. A nontransitory processor-readable storage medium comprising program instructions that, when executed by one or more processors, perform a method of restoring user equipment control in the presence of communication link failure between a network node that provides control of packet switched connections and a network node that provides control of circuit switched connections, the method comprising:

using a serving node of a first type in communication with a node of a second type to provide a communication service to a user equipment, wherein the serving node of the first type controls one of packet switched connections and circuit switched connections, and the node of the second type controls a different one of packet switched connections and circuit switched connections;

detecting a failure of one or more links that enable communication between the serving node of the first type and the node of the second type;

identifying another node, wherein the identified node is to be used as a first relaying node and is one of:
  another node of the first type that has fully operational links with the node of the second type; and
  another node of the second type that has fully operational links with the serving node of the first type;

performing signaling to establish the identified node as the first relaying node; and continuing to provide the communication service to the user equipment by using the first relaying node to communicate one or more messages between the serving node of the first type and the node of the second type.

* * * * *

UNITED STATES PATENT AND TRADEMARK OFFICE
CERTIFICATE OF CORRECTION

PATENT NO. : 9,549,348 B2
APPLICATION NO. : 14/405170
DATED : January 17, 2017
INVENTOR(S) : Olsson et al.

It is certified that error appears in the above-identified patent and that said Letters Patent is hereby corrected as shown below:

On the Title Page

In Item (56), under "OTHER PUBLICATIONS", in Column 2, Line 1, delete "chen" and insert -- chen et al. --, therefor.

In Item (56), under "OTHER PUBLICATIONS", in Column 2, Line 3, delete "pp. 1-4." and insert -- pp. 1-3. --, therefor.

On Page 2, in Item (56), under "OTHER PUBLICATIONS", in Column 1, Line 8, delete "pp. 1-6." and insert -- pp. 1-5. --, therefor.

On Page 2, in Item (56), under "OTHER PUBLICATIONS", in Column 2, Line 25, delete "9CS)" and insert -- (CS) --, therefor.

In the Specification

In Column 2, Line 50, delete "Data" and insert -- Data rates --, therefor.

In Column 2, Line 53, delete "Pool"" and insert -- Pool". --, therefor.

In Column 5, Line 35, delete "example" and insert -- example, --, therefor.

In Column 8, Line 48, delete "I/F" and insert -- OF --, therefor.

In Column 11, Line 47, delete "I/F" and insert -- I/F. --, therefor.

In Column 18, Line 37, delete "example" and insert -- example, --, therefor.

Signed and Sealed this
Twelfth Day of September, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,549,348 B2

In the Claims

In Column 22, Line 24, in Claim 13, delete "wherein;" and insert -- wherein: --, therefor.

In Column 24, Line 34, in Claim 28, delete "wherein;" and insert -- wherein: --, therefor.